United States Patent
Park

(10) Patent No.: US 11,535,075 B2
(45) Date of Patent: *Dec. 27, 2022

(54) INDEPENDENT SUSPENSION SYSTEM

(71) Applicants: HYUNDAI MOTOR COMPANY, Seoul (KR); KIA CORPORATION, Seoul (KR)

(72) Inventor: Jeong Hwan Park, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/380,584

(22) Filed: Jul. 20, 2021

(65) Prior Publication Data
US 2022/0153078 A1 May 19, 2022

(30) Foreign Application Priority Data
Nov. 19, 2020 (KR) .................. 10-2020-0155437

(51) Int. Cl.
*B60G 13/00* (2006.01)
*B60G 7/00* (2006.01)

(52) U.S. Cl.
CPC ........... *B60G 13/005* (2013.01); *B60G 7/001* (2013.01); *B60G 2200/44* (2013.01);
(Continued)

(58) Field of Classification Search
CPC .. B60G 13/005; B60G 7/001; B60G 2200/44; B60G 2202/21; B60G 2204/4193;
(Continued)

(56) References Cited

U.S. PATENT DOCUMENTS 2,174,315 A * 9/1939 Dowty ................... B64C 25/36
244/104 R
RE22,255 E * 1/1943 Dowty ................... B64C 25/06
244/104 R
(Continued)

FOREIGN PATENT DOCUMENTS

JP 2005-112300 A 4/2005

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

An independent suspension system includes a steering unit configured to be controlled to adjust the steering angle of a wheel, a shock absorber engaged with the wheel in order to absorb external impacts applied to the wheel and including first and second shock absorbers, each of the first shock absorber and the second shock absorber arranged in a forward-rearward direction on opposite side surfaces of the wheel, respectively, and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and a ground clearance adjustment unit engaged with the first and second upper arms and configured to vary the distance therebetween while varying the distance between the wheel and the steering unit at the same time.

13 Claims, 4 Drawing Sheets

(52) U.S. Cl.
CPC .. *B60G 2202/21* (2013.01); *B60G 2204/4193* (2013.01); *B60G 2204/422* (2013.01); *B60G 2206/50* (2013.01); *B60G 2500/30* (2013.01); *B60G 2800/24* (2013.01)

(58) Field of Classification Search
CPC .......... B60G 2204/422; B60G 2206/50; B60G 2500/30; B60G 2800/24; B60G 2200/10; B60G 2204/128; B60G 2204/129; B60G 2204/4192; B60G 2500/10; B60G 13/001; B60G 3/20; B60G 2204/41; B60G 2204/419; B60G 2300/37; B60G 2800/162; B60G 3/01; B60G 17/0157; B60G 17/0165; B62D 7/023
See application file for complete search history.

(56) References Cited

U.S. PATENT DOCUMENTS

| | | | | |
|---|---|---|---|---|
| 5,415,426 | A * | 5/1995 | Strasser | B60G 3/18 280/124.136 |
| 5,486,018 | A * | 1/1996 | Sakai | B60G 21/06 280/124.16 |
| 6,241,391 | B1 * | 6/2001 | Hoose | F16F 9/58 384/49 |
| 6,371,237 | B1 * | 4/2002 | Schaffer | B62D 7/06 280/124.17 |
| 6,811,454 | B2 * | 11/2004 | Royle | B62D 61/12 440/12.5 |
| 6,814,363 | B2 * | 11/2004 | Fitzgerald | B60G 3/00 280/124.125 |
| 7,222,863 | B2 * | 5/2007 | Deal | B60G 3/01 280/5.521 |
| 7,938,210 | B2 * | 5/2011 | Kunzler | B60G 17/0195 280/124.1 |
| 8,235,404 | B2 * | 8/2012 | Dada | B60G 3/26 280/124.135 |
| 8,256,780 | B2 * | 9/2012 | Shibuya | B60G 3/18 280/93.51 |
| 8,465,025 | B2 * | 6/2013 | Venton-Walters | B60G 17/0525 280/124.16 |
| 8,746,383 | B2 * | 6/2014 | Basadzishvili | B60G 3/01 280/124.1 |
| 8,820,680 | B2 * | 9/2014 | Ferraz | B64C 25/14 244/102 A |
| 9,079,470 | B2 * | 7/2015 | Slawson | B62D 49/0607 |
| 9,180,747 | B2 * | 11/2015 | Slawson | A01B 76/00 |
| 9,193,240 | B2 * | 11/2015 | Lin | A61G 5/045 |
| 9,346,497 | B2 * | 5/2016 | Dames | B62D 49/0678 |
| 9,511,644 | B2 * | 12/2016 | Tollefsrud | B60G 17/0272 |
| 9,533,706 | B2 * | 1/2017 | Faymonville | B62D 7/1509 |
| 9,580,115 | B2 * | 2/2017 | Haller | F16F 9/185 |
| 9,688,113 | B2 * | 6/2017 | Ruppert | B60G 17/0272 |
| 9,725,130 | B2 * | 8/2017 | Takano | B62K 25/08 |
| 9,834,271 | B1 * | 12/2017 | Hsing | B62K 5/10 |
| 10,850,585 | B2 * | 12/2020 | Yamada | B60K 7/0007 |
| 11,235,887 | B2 * | 2/2022 | Thompson | B64C 25/34 |
| 11,383,573 | B2 * | 7/2022 | Zink | B60G 3/01 |
| 2003/0102176 | A1 * | 6/2003 | Bautista | B62K 5/027 280/124.103 |
| 2005/0280236 | A1 * | 12/2005 | Vallejos | B60G 3/01 280/124.11 |
| 2006/0046826 | A1 * | 3/2006 | Gilmartin | B60G 3/28 463/19 |
| 2007/0262552 | A1 * | 11/2007 | Sutton | B60G 3/06 280/124.157 |
| 2008/0185807 | A1 * | 8/2008 | Takenaka | B60G 3/14 280/124.153 |
| 2011/0095502 | A1 * | 4/2011 | Dada | B60G 3/26 280/124.127 |
| 2021/0260947 | A1 * | 8/2021 | Sardes | B60G 3/207 |
| 2021/0269116 | A1 * | 9/2021 | Butenko | B62K 1/00 |
| 2022/0153074 | A1 * | 5/2022 | Park | B62D 9/00 |
| 2022/0153338 | A1 * | 5/2022 | Park | B62D 3/04 |
| 2022/0176765 | A1 * | 6/2022 | Gao | B62D 57/024 |

\* cited by examiner

FIG. 1  - PRIOR ART -
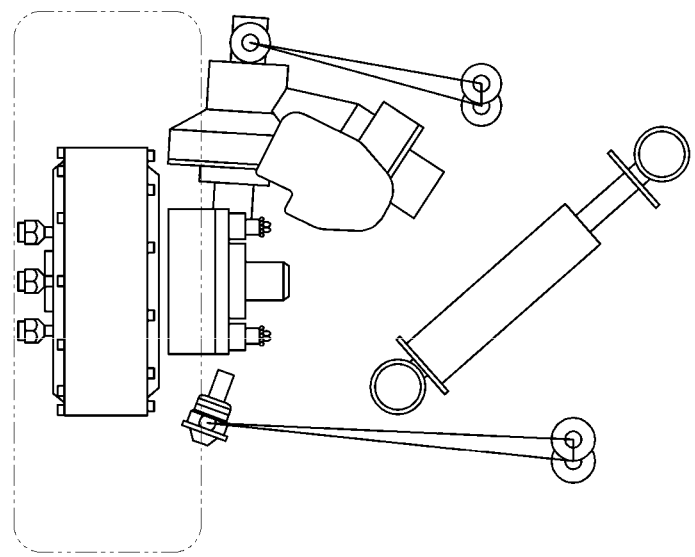
FIG. 2
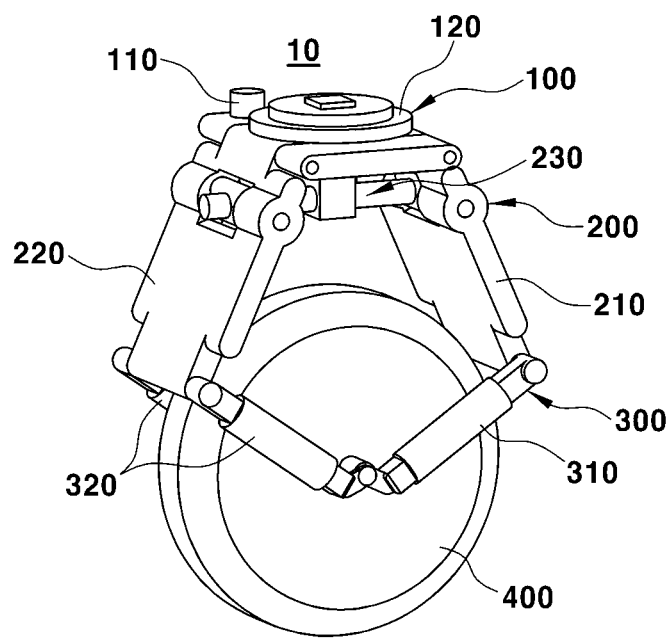

LEFT-HANDED THREAD

RIGHT-HANDED THREAD

INDEPENDENT SUSPENSION SYSTEM

CROSS-REFERENCE TO RELATED APPLICATION

This application claims under the benefit of priority to Korean Patent Application No. 10-2020-0155437 filed on Nov. 19, 2020 in the Korean Intellectual Property Office, the entire contents of which are incorporated herein by reference.

TECHNICAL FIELD

The present disclosure relates to an independent suspension system. More particularly, the present disclosure relates to an independent suspension system that is engaged with each wheel of a vehicle and has a structure for varying a distance between the vehicle body and the wheel, thereby providing improved ride comfort to an occupant.

BACKGROUND

A conventional vehicle suspension system connects an axle and a vehicle body in order to prevent vibration or impact, which the axle receives from the road surface while the vehicle is running, from being directly transferred to the vehicle body, thereby preventing damage to the vehicle body or cargo and improving ride comfort. In general, a suspension system includes a suspension spring, which mitigates impacts received from the road surface, a shock absorber, which dampens vibration of the suspension spring in order to improve ride comfort, and a stabilizer, which suppresses rolling of the vehicle.

A commercial vehicle mainly uses a solid-axle suspension system, in which the left wheel and the right wheel are connected via a single axle. A leaf spring or an air spring is mainly used as a suspension spring.

A steering system of such a commercial vehicle, which uses a solid-axle suspension system, includes a pitman arm, which is rotatably mounted to an output shaft of a steering gear, a drag link, which transmits the movement of the pitman arm to a knuckle arm, the knuckle arm receiving movement of the drag link to operate a knuckle spindle, and a tie rod, which connects a left knuckle arm and a right knuckle arm.

In a commercial vehicle equipped with the solid-axle suspension system using an air spring and the steering system described above, the air spring merely serves as a substitute for a leaf spring, and does not greatly contribute to improving ride comfort or steering characteristics. In addition, it is difficult to achieve precise geometry and to increase design freedom due to the structural characteristics thereof.

In recent years, there has been developed an independent-steering-type suspension system, in which a steering angle of a wheel is input to each suspension system through a motor assembly. However, the independent-steering-type suspension system described above has a problem in that a shock absorber needs to protrude in the height direction of a vehicle so as to be aligned with a steering shaft of the motor assembly.

In addition, as shown in FIG. 1, in the case in which one end of a shock absorber is fixed to a vehicle body frame, variation in the length of the shock absorber when the wheel travels over a bump is small, leading to deterioration in ride comfort.

For this reason, in recent years, there has been required a suspension system capable of providing improved ride comfort in various travel environments by varying the height between a wheel and a vehicle body.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an independent suspension system capable of varying the distance between a wheel and a vehicle body.

It is another object of the present disclosure to provide an independent suspension system capable of controlling the movement of a link unit and variation in the vertical distance from a wheel to the link unit simultaneously.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

In one aspect, the present disclosure provides an independent suspension system including a steering unit configured to be controlled to adjust a steering angle of a wheel in a lateral direction, a shock absorber engaged with the wheel in order to absorb impacts applied to the wheel and including a first shock absorber and a second shock absorber, each of the first shock absorber and the second shock absorber arranged in a forward-rearward direction on opposite side surfaces of the wheel, respectively, and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and a ground clearance adjustment unit engaged with the first upper arm and the second upper arm in order to vary the distance between the first upper arm and the second upper arm while varying the distance between the wheel and the steering unit at the same time.

The steering unit may be controlled such that a steering angle to be applied to the wheel is set by a steering input part located at a vehicle body.

The ground clearance adjustment unit may include a first fixing bracket located in an opening in the first upper arm, a second fixing bracket located in an opening in the second upper arm, a spindle part located between the first fixing bracket and the second fixing bracket to adjust the distance between the first fixing bracket and the second fixing bracket, a driving unit engaged with the spindle part to provide driving force to the spindle part so as to vary the distance between the first fixing bracket and the second fixing bracket, and a gear part located between the driving unit and the spindle part to move the spindle part in a height direction using the driving force of the driving unit.

The gear part may be engaged with a gear of the driving unit to apply the rotational force of the driving unit to the spindle part and to vary the distance between the gear part and the steering input part simultaneously.

The independent suspension system may further include a first protrusion formed at the first fixing bracket and a first insertion hole formed in the first upper arm. The first protrusion may be inserted into the first insertion hole such that the first fixing bracket is rotatably engaged with the first upper arm.

The independent suspension system may further include a second protrusion formed at the second fixing bracket and a second insertion hole formed in the second upper arm. The second protrusion may be inserted into the second insertion hole such that the second fixing bracket is rotatably engaged with the second upper arm.

The independent suspension system may further include a cover unit configured to integrally surround the gear part and at least a portion of the driving unit.

When the first upper arm and the second upper arm are moved close to each so other with respect to the ends thereof that are engaged with the steering unit, the distance between the steering unit and the wheel may be increased.

When the first upper arm and the second upper arm are moved away from each other with respect to the ends thereof that are engaged with the steering unit, the distance between the steering unit and the wheel may be reduced.

The steering input part may include a motor fixed to a vehicle body and a gear unit connected to a motor gear located in a driving part of the motor.

The gear unit may be implemented as a worm gear or a pinion gear.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a view showing the configuration of a conventional suspension system;

FIG. 2 is a perspective view of an independent suspension system according to an embodiment of the present disclosure;

Figure 3:
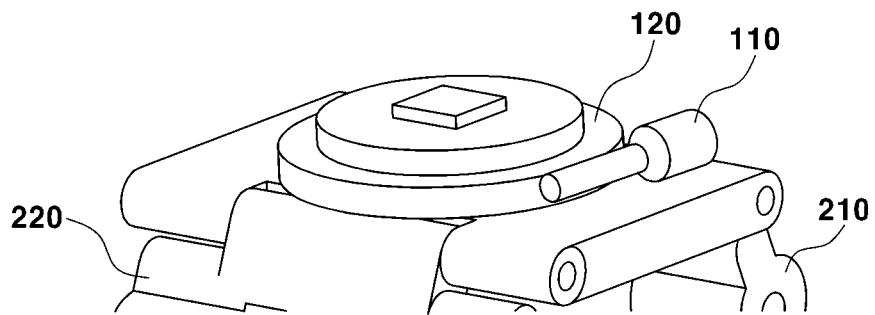
FIG. 3 is a view showing a steering unit of the independent suspension system according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be thorough and complete, and will fully convey the scope of the disclosure to those skilled in the art.

The terms "-part", "-unit", and "-system" described in the specification mean units for processing at least one function or operation, and can be implemented as hardware components, software components, or combinations of hardware components and software components.

Further, in the following description, the terms "first" and "second" are used only to avoid confusing designated components, and do not indicate the sequence or importance of the components or the relationships between the components.

An independent suspension system of the present disclosure refers to one suspension system that is engaged with each wheel. In the case of a multi-wheel vehicle, each wheel may be provided with an independent suspension system capable of achieving independent steering.

Hereinafter, the embodiment will be described in detail with reference to the accompanying drawings. In the following description and the accompanying drawings, components having the same functional configurations are denoted by the same reference numerals, and a duplicate explanation thereof will be omitted.

The present disclosure relates to an independent suspension system provided at each wheel so as to be rotatable independently.

Moreover, the present disclosure is mounted to each wheel, and is configured to allow the steering angle of the wheel to be varied without limitation. The steering angle may be controlled by a controller (not shown) so that the independent suspension system mounted to each wheel is capable of being oriented at an angle different from those of other independent suspension systems. In addition, the wheel of the present disclosure may include an in-wheel motor.

In addition, the controller of the present disclosure may receive a steering input signal input to the vehicle, may receive information on the travel environment and road conditions through a sensor (not shown) mounted in the vehicle, and may vary the height of the independent suspension system.

In the various embodiments of the present disclosure, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure.

Further, the controller according to the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The controller may be at least one microprocessor operated by a predetermined program which may include a series of commands for carrying out the method included in the aforementioned various exemplary embodiments of the present disclosure.

Hereinafter, the engagement relationships between components of an independent suspension system mounted to each wheel according to an embodiment of the present disclosure will be described.

FIG. 2 is a perspective view of an independent suspension system 10 according to an embodiment of the present disclosure.

As shown, the independent suspension system 10 includes a shock absorber 300 configured to absorb impacts applied to a wheel 400, a link unit 200 engaged with the upper end of the shock absorber 300, and a steering unit 100 disposed on the upper end of the link unit 200 and including a steering input part 110 in order to control the steering angle of the wheel 400. The link unit 200 serves to vary the distance between the steering unit 100 and the wheel 400.

The shock absorber 300 is engaged with the central shaft of the wheel 400, and extends forwards and backwards on opposite side surfaces of the wheel 400. Preferably, a first shock absorber 310 is engaged with a first upper arm 210, and a second shock absorber 320 is engaged with a second upper arm 220. Each of the first shock absorber 310 and the second shock absorber 320 includes two rods that are in contact with opposite side surfaces of the wheel 400. In other words, according to an embodiment of the present disclosure, the shock absorber 300 includes four rods engaged with the central shaft of the wheel 400. Among the four rods, the two rods extending forwards are included in the first shock absorber 310, and the two rods extending backwards are included in the second shock absorber 320.

In addition to the first and second shock absorbers 310 and 320 engaged with the central shaft of the wheel 400, the shock absorber 300 includes a wheel bush, which is surrounded by the first shock absorber 310 and the second shock absorber 320. The wheel bush may surround the central shaft of the wheel 400, and the first shock absorber 310 and the second shock absorber 320 may surround the outer surface of the wheel bush. The wheel bush of the present disclosure may be compressed or expanded along three axes by road shock and side force attributable to variation in steering angle.

The steering unit 100 includes a steering input part 110 fixed to a vehicle body and a frame 120 disposed adjacent to the steering input part 110 in order to enable the independent suspension system 10 to be integrally rotated. When a steering input signal is applied thereto from the controller, the steering input part 110 applies rotational force to the frame 120, and the frame 120 is integrally rotated with the wheel 400, whereby the steering angle of the wheel 400 is varied.

As one embodiment of the present disclosure, the steering input part 110 may include a motor fixed to a vehicle body, and a gear unit engaged with the frame 120 may be implemented as a pinion gear, so the independent suspension system 10 is integrally rotated.

As another embodiment of the present disclosure, the frame 120 may be configured so as to be engaged with the gear unit, which is implemented as a worm gear, in order to receive rotational force from the steering input part 110, which includes a motor. Accordingly, the frame 120 is integrally rotated with the wheel 400 in response to the rotation of the worm gear.

The link unit 200 includes two links, which are arranged in the forward-rearward direction so as to be respectively engaged with the first shock absorber 310 and the second shock absorber 320. The link unit 200 includes a first upper arm 210 engaged with the first shock absorber 310 and a second upper arm 220 engaged with the second shock absorber 320. In addition, the link unit 200 further includes a ground clearance adjustment unit 230, which penetrates an opening in the first upper arm 210 and an opening in the second upper arm 220 and varies the distance between the steering unit 100 and the wheel 400 by varying the distance between the first upper arm 210 and the second upper arm 220. In the various embodiments, the ground clearance adjustment unit 230 may have a rod shape as shown in the drawings, however, it is not limited thereto.

The ground clearance adjustment unit 230 includes a first fixing bracket 231, which is located in the opening in the first upper arm 210, a second fixing bracket 232, which is located in the opening in the second upper arm 220, and a spindle part 260, which is engaged with the first fixing bracket 231 and the second fixing bracket 232 in the state of being disposed therebetween. The distance between the first upper arm 210 and the second upper arm 220 is varied according to the amount of rotation of the spindle part 260. That is, the spindle part 260 is engaged with the first fixing bracket 231 and the second fixing bracket 232 so that the rotational force of the spindle part 260 is applied thereto, and the spindle part 260 is configured to be rotated in both directions.

The second fixing bracket 232, which is in contact with the outer surface of the spindle part 260, is moved in the longitudinal direction by the rotational force of the spindle part 260. When the second fixing bracket 232 is moved, the second upper arm 220 engaged with the second fixing bracket 232 is also moved, whereby the distance between the second upper arm 220 and the first upper arm 210 is varied.

That is, when the rotational force of the spindle part 260 is applied, the angle formed by one end of the first upper arm 210 and one end of the second upper arm 220, which are engaged with the steering unit 100, is varied. When the first upper arm 210 and the second upper arm 220 are located closest to each other, the distance between the steering unit 100 and the wheel 400 is maximized, and when the first upper arm 210 and the second upper arm 220 are located farthest from each other, the distance between the steering unit 100 and the wheel 400 is minimized. When the rotational force of the spindle part 260 is applied, the first upper arm 210 and the second upper arm 220 are maintained symmetrical with each other with respect to the center line in the height direction.

The spindle part 260 is engaged with thread grooves formed inside the first fixing bracket 231 and the second fixing bracket 232, and is rotated by the rotational force of a driving unit 240, which is fixed to a plate on which the steering input part 110 is disposed. Depending on the direction in which the spindle part 260 is rotated, the first fixing bracket 231 and the second fixing bracket 232, which are threadedly engaged with the spindle part 260, are moved away from or close to each other.

In addition, the ground clearance adjustment unit 230 includes a gear part 250, which is disposed between the driving unit 240 and the spindle part 260 in order to move the spindle part 260 in the height direction using the driving force of the driving unit 240. The gear part 250 is engaged with the driving unit 240 in order to transfer the rotational force of the driving unit 240 to the spindle part 260 and to move the spindle part 260 in the height direction using the rotational force of the driving unit 240. That is, the gear part 250, which receives the rotational force of the driving unit 240, axially rotates the spindle part 260 in order to vary the distance between the first fixing bracket 231 and the second fixing bracket 232, and at the same time, moves the spindle part 260 in the height direction in order to respond to variation in the height of a first protrusion 233 of the first fixing bracket 231 and variation in the height of a second protrusion 234 of the second fixing bracket 232.

FIG. 3 is an enlarged view of the steering unit 100 including the steering input part 110.

The steering input part 110 is engaged with the vehicle body, whereby the steering unit 100, the link unit 200, and the shock absorber 300 are integrally rotated. The steering input part 110 may be implemented as a driving motor, and may include a gear unit, which is engaged with the frame 120. The gear unit of the present disclosure may be implemented as a pinion gear, which is engaged with recesses formed in the frame 120.

As another embodiment of the present disclosure, the steering input part 110 may include a gear unit, which is implemented as a worm gear. The steering unit 100 is rotated relative to the vehicle body by the rotational force of the worm gear engaged with the motor.

The steering input part 110 described above rotates the frame 120 of the steering unit 100 in response to receipt of a steering input request by the controller, and thus the shock absorber 300 and the link unit 200, which are engaged with the steering unit 100, are integrally rotated with the steering unit 100 in a direction corresponding to the steering input of the wheel 400.

Figure 4A:
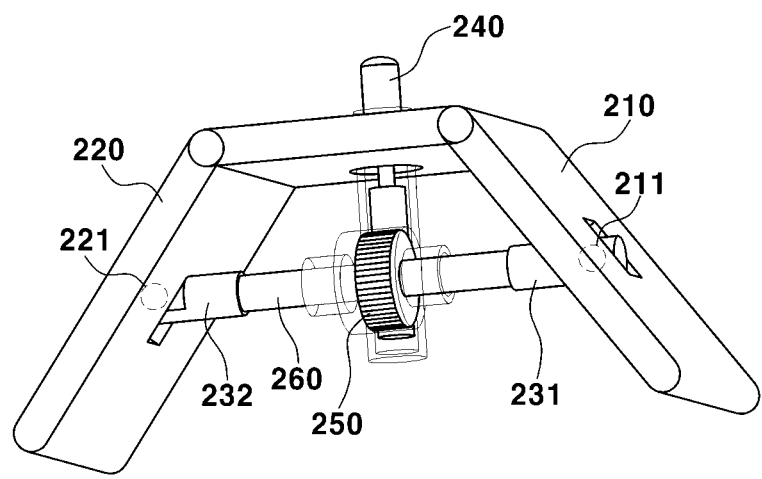
FIG. 4A is a view showing a ground clearance adjustment unit of the independent suspension system according to an embodiment of the present disclosure.

FIG. 4A is a perspective view of the independent suspension system including the ground clearance adjustment unit 230 according to an embodiment of the present disclosure.

The ground clearance adjustment unit 230 is configured to vary the distance between the steering unit 100 and the wheel 400. The ground clearance adjustment unit 230 includes a spindle part 260, which is engaged with the first fixing bracket 231, which is disposed in the opening in the first upper arm 210, and the second fixing bracket 232, which is disposed in the opening in the second upper arm 220, while being disposed therebetween. The spindle part 260 is rotated by the rotational force of the driving unit 240, and the first fixing bracket 231 and the second fixing bracket 232, which are engaged with the spindle part 260, are moved along the spindle part 260 in the longitudinal direction by the rotation of the spindle part 260.

When the spindle part 260 is rotated, the first fixing bracket 231 and the second fixing bracket 232 are moved in the longitudinal direction of the spindle part 260 while being spaced the same distance apart from the center of the spindle part 260. The first fixing bracket 231 and the second fixing bracket 232, which surround the spindle part 260, may have thread grooves formed in the inner surfaces thereof so as to mesh with the threads formed on the outer surface of the spindle part 260. Due to this configuration, when the spindle part 260 is rotated, the distance between the first fixing bracket 231 and the second fixing bracket 232 is varied.

The first fixing bracket 231 includes a first protrusion 233 formed to be engaged with the first upper arm 210. The first protrusion 233 is inserted into a first insertion hole 211 formed in the opening in the first upper arm 210 so that the first fixing bracket 231 may be rotated about the first protrusion 233.

The second fixing bracket 232 includes a second protrusion 234 formed to be engaged with the second upper arm 220. The second protrusion 234 is inserted into a second insertion hole 221 formed in the opening in the second upper arm 220 so that the second fixing bracket 232 may be rotated about the second protrusion 234.

As one embodiment of the present disclosure, the distance between the first fixing bracket 231 and the second fixing bracket 232 is varied in response to rotation of the spindle part 260, and thus the distance between the first upper arm 210 and the second upper arm 220 is varied. Accordingly, the angle formed by the first upper arm 210 and the first fixing bracket 231 and the angle formed by the second upper arm 220 and the second fixing bracket 232 are varied.

That is, this variation in angle attributable to variation in the distance between the first upper arm 210 and the second upper arm 220 is realized by the structure of the first fixing bracket 231 and the second fixing bracket 232, which is rotatable relative to the upper arms 210 and 220.

In addition, when the distance between the first upper arm 210 and the second upper arm 220 is varied by rotation of the spindle part 260, the height of the spindle part 260 is varied. To this end, the spindle part 260 includes a gear part 250, which is engaged with the driving unit 240 and is configured to be movable in the height direction.

In one embodiment of the present disclosure, the gear part 250 serves to transfer the rotational force of the driving unit 240 to the spindle part 260 and to move the spindle part 260 in the height direction simultaneously. The gear part 250 axially rotates the spindle part 260 in order to vary the distance between the first upper arm 210 and the second upper arm 220. When the distance between the first upper arm 210 and the second upper arm 220 is varied, the gear part 250 guides the movement of the spindle part 260 in the height direction. To this end, the gear part 250 is configured to move along the driving shaft of the driving unit 240 so as to move the spindle part 260 in the height direction.

In another embodiment of the present disclosure, the driving unit 240 may penetrate the plate, and may be moved together with the spindle part 260 when the spindle part 260 is moved in the height direction.

The independent suspension system of the present disclosure further includes a cover unit 500, which covers the gear part 250, at least a portion of the spindle part 260, and at least a portion of the driving shaft of the driving unit 240. The cover unit 500 is formed so as to be integrally moved with the driving unit 240 in response to movement of the spindle part 260 in the height direction.

Figure 4B:
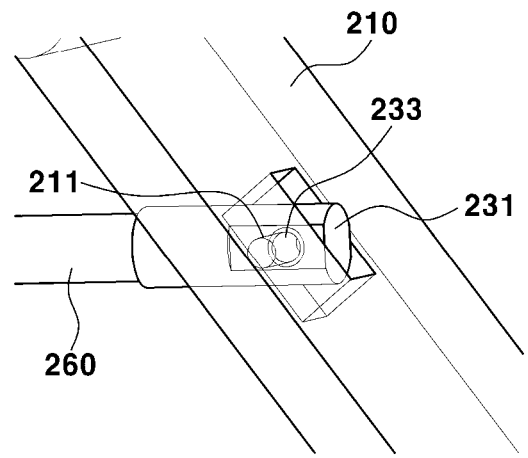
FIG. 4B is an enlarged view of a fixing bracket of the ground clearance adjustment unit according to an embodiment of the present disclosure.

FIG. 4B shows the configuration in which the first fixing bracket 231 is engaged with the first upper arm 210.

As shown, the first fixing bracket 231 is located in the opening in the first upper arm 210, and includes a first protrusion 233, which is formed at a position corresponding to the first insertion hole 211 formed in the inner surface of the opening in the first upper arm 210.

The first protrusion 233 is inserted into the first insertion hole 211. The first fixing bracket 231 is rotated about the first protrusion 233 according to variation in the angle of the first upper arm 210 so that the spindle part 260 and the first fixing bracket 231 are maintained perpendicular to each other.

In addition, the second fixing bracket 232, which is disposed opposite the first fixing bracket 231, includes a second protrusion 234, which is inserted into the second insertion hole 221 formed in the second upper arm 220. The second fixing bracket 232 is rotated about the second protrusion 234 so that the angle formed by the second upper arm 220 and the second fixing bracket 232 is equal to the angle formed by the first upper arm 210 and the first fixing bracket 231.

Therefore, when the distance between the first upper arm 210 and the second upper arm 220 is varied by rotation of the spindle part 260, the first fixing bracket 231 and the second fixing bracket 232 are maintained perpendicular to the spindle part 260.

Figure 4C:
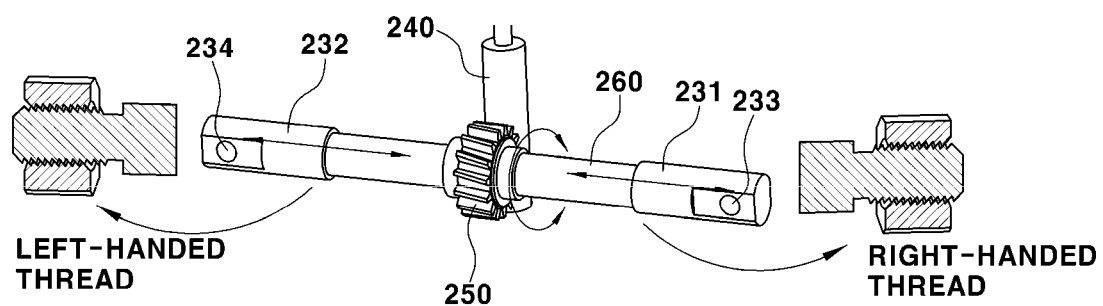
FIG. 4C is a view showing the engagement structure of a spindle part of the ground clearance adjustment unit according to an embodiment of the present disclosure.
Figure 4D:
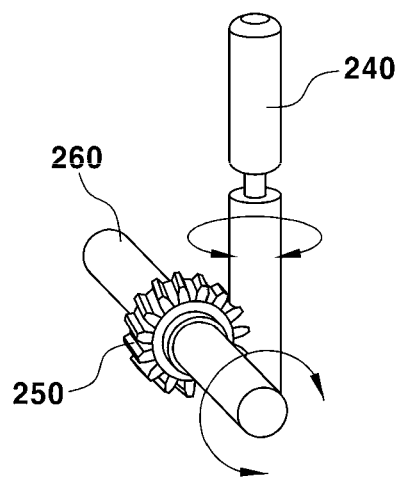
FIG. 4D is a view showing the engagement relationships between the spindle part and a driving unit according to an embodiment of the present disclosure.

FIGS. 4C and 4D show the engagement relationships between the driving unit 240 for rotating the spindle part 260 and the gear part 250 for transferring the driving force of the driving unit 240 to the spindle part 260.

As shown, the spindle part 260 has threads formed on opposite end portions thereof. The threads of the spindle part 260 are engaged with thread grooves formed in the inner surfaces of the first fixing bracket 231 and the second fixing bracket 232. The threads may be formed longer than the thread grooves. Due to this configuration, when the spindle part 260 is rotated, the distance between the first fixing bracket 231 and the second fixing bracket 232 is varied.

The driving unit 240 is located adjacent to the center of the spindle part 260, and is engaged with the gear part 250, which is formed so as to surround the outer side of the spindle part 260.

As one embodiment of the present disclosure, when the driving force of the driving unit 240 is applied thereto, the gear part 250 transfers the driving force to the spindle part 260 so that the spindle part 260 is rotated. The gear part 250 is threadedly engaged with the driving shaft of the driving unit 240, which extends in the height direction. The driving shaft is provided with a gear part, with which the gear part 250 coupled to the spindle part 260 meshes so as to be moved in the height direction.

As another embodiment of the present disclosure, the driving unit 240 may be controlled so as to be moved together with the spindle part 260 in the height direction when the spindle part 260 is moved in the height direction. The driving unit 240 may penetrate the plate on which the steering input part is disposed, and may be moved in the height direction of the plate in response to movement of the spindle part 260 in the height direction.

The first fixing bracket 231 and the second fixing bracket 232 are disposed at respective end portions of the spindle part 260, which is engaged with the gear part 250. The spindle part 260 is engaged with the first fixing bracket 231 and the second fixing bracket 232 in the state of penetrating the same.

Since the thread grooves formed in the inner surfaces of the first fixing bracket 231 and the second fixing bracket 232 are engaged with the threads formed on the outer surface of the spindle part 260, the distance between the first fixing bracket 231 and the second fixing bracket 232 is varied by rotation of the spindle part 260.

Further, when the spindle part 260 is rotated, the first fixing bracket 231 and the second fixing bracket 232, which are engaged with the spindle part 260, are moved the same distance away from or close to the center of the spindle part 260.

Therefore, the distance between the first upper arm 210 and the second upper arm 220 is varied depending on the amount of rotation of the spindle part 260.

Figure 4E:
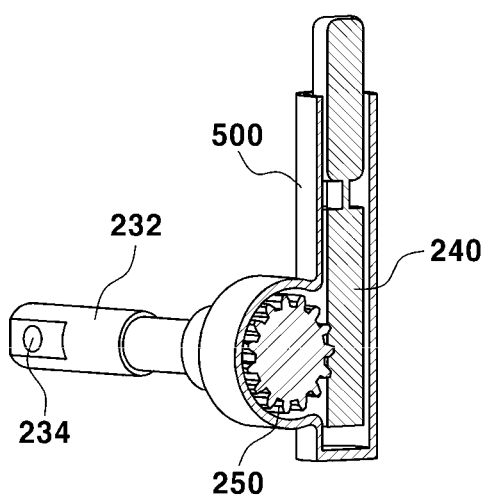
FIG. 4E is a view showing the cross-section of a cover unit of the ground clearance adjustment unit according to an embodiment of the present disclosure.

FIG. 4E shows the configuration of the ground clearance adjustment unit 230 including the cover unit 500 as one embodiment of the present disclosure.

The cover unit 500 surrounds the gear part 250, which is located at the center of the spindle part 260, and at least a portion of the driving shaft of the driving unit 240, which is located adjacent to the gear part 250.

The cover unit 500 serves to prevent the gear part 250 and the driving shaft from being separated from each other when a vehicle travels and to prevent introduction of external foreign matter. Grease for lubrication may be applied to the inner surface of the cover unit 500, and the cover unit 500 may be engaged with other components in a sealing manner.

Further, the cover unit 500 is configured to be moved together with the driving unit 240 when the driving unit 240 is moved while penetrating the plate upon movement of the spindle part 260 in the height direction.

As is apparent from the above description, the present disclosure provides the following effects through the above embodiments and through the configurations and combination and use relationships described above.

The independent suspension system of the present disclosure is capable of varying the distance between a vehicle body and a wheel depending on the environment in which a vehicle travels, thereby improving ride comfort.

In addition, the independent suspension system of the present disclosure is structured such that a link unit is engaged with other components via fixing brackets, thus exhibiting improved durability.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The above description is illustrative of the present disclosure. The above disclosure is intended to illustrate and explain preferred embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. The appended claims should be construed as encompassing such other embodiments.

What is claimed is:

1. An independent suspension system of a vehicle, comprising:
    a steering unit configured to be controlled to adjust a steering angle of a wheel;
    a shock absorber engaged with the wheel in order to absorb external impacts applied to the wheel, the shock absorber comprising a first shock absorber and a second shock absorber, each of the first shock absorber and the second shock absorber arranged in a forward-rearward direction on opposite side surfaces of the wheel, respectively; and
    a link unit disposed between the shock absorber and the steering unit, the link unit being configured to vary a distance between the wheel and the steering unit,
    wherein the link unit comprises:
        a first upper arm disposed between the first shock absorber and the steering unit;
        a second upper arm disposed between the second shock absorber and the steering unit; and
        a ground clearance adjustment unit engaged with the first upper arm and the second upper arm, the ground clearance adjustment unit configured to vary a distance between the first upper arm and the second upper arm while varying the distance between the wheel and the steering unit at the same time.

2. The independent suspension system of claim 1, wherein the steering unit is configured to be controlled such that the steering angle to be applied to the wheel is set by a steering input part located at a vehicle body of the vehicle.

3. The independent suspension system of claim 2, wherein the steering input part comprises:
    a gear unit connected to a motor gear of a driving part of the motor.

4. The independent suspension system of claim 3, wherein the gear unit includes a worm gear or a pinion gear.

5. The independent suspension system of claim 4, wherein the first shock absorber and the second shock absorber are connected to each other at a center of the wheel, and
    wherein each of the first shock absorber and the second shock absorber includes a set of arms symmetrically located at the opposite sides of the wheel.

6. The independent suspension system of claim 1, wherein the ground clearance adjustment unit comprises:
    a first fixing bracket extending through an opening in the first upper arm;
    a second fixing bracket extending through an opening in the second upper arm;
    a spindle part disposed between the first fixing bracket and the second fixing bracket to adjust a distance between the first fixing bracket and the second fixing bracket;
    a driving unit engaged with the spindle part to provide a driving force to the spindle part so as to vary the distance between the first fixing bracket and the second fixing bracket; and
    a gear part disposed between the driving unit and the spindle part and configured to move the spindle part in a height direction using the driving force of the driving unit.

7. The independent suspension system of claim 6, wherein the gear part is engaged with a gear of the driving unit to apply a rotational force of the driving unit to the spindle part while varying a distance between the gear part and a steering input part at the same time.

8. The independent suspension system of claim 7, wherein, when the spindle part receives and transmit the rotational force to the first and second fixing brackets, the first upper arm and the second upper arm are maintained symmetrical with each other with respect to a center line in the height direction.

9. The independent suspension system of claim 6, further comprising
    a first protrusion disposed on the first fixing bracket,
    wherein the first upper arm has a first insertion hole, and
    wherein the first protrusion extends through the first insertion hole such that the first fixing bracket is rotatably engaged with the first upper arm.

10. The independent suspension system of claim 6, further comprising a second protrusion disposed on the second fixing bracket,
    wherein the second upper arm has a second insertion hole, and
    wherein the second protrusion extends through the second insertion hole such that the second fixing bracket is rotatably engaged with the second upper arm.

11. The independent suspension system of claim 6, further comprising a cover unit configured to surround the gear part and at least a portion of the driving unit.

12. The independent suspension system of claim 1, wherein, when the first upper arm and the second upper arm become closer to each other with respect to ends of the first upper arm and the second upper arm, respectively, that are engaged with the steering unit, a distance between the steering unit and the wheel becomes larger.

13. The independent suspension system of claim 1, wherein, when the first upper arm and the second upper arm become farther away from each other with respect to ends of the first upper arm and the second upper arm, respectively, that are engaged with the steering unit, a distance between the steering unit and the wheel becomes smaller.

* * * * *